US010521715B1

United States Patent
Ioffe et al.

(10) Patent No.: US 10,521,715 B1
(45) Date of Patent: Dec. 31, 2019

(54) LONG SHORT-TERM MEMORY CELLS WITH SATURATING GATING FUNCTIONS

(71) Applicant: Google LLC, Mountain View, CA (US)

(72) Inventors: Sergey Ioffe, Mountain View, CA (US); Raymond Wensley Smith, Los Altos, CA (US)

(73) Assignee: Google LLC, Mountain View, CA (US)

( * ) Notice: Subject to any disclaimer, the term of this patent is extended or adjusted under 35 U.S.C. 154(b) by 796 days.

(21) Appl. No.: 14/997,422

(22) Filed: Jan. 15, 2016

(51) Int. Cl.
  *H01L 29/08* (2006.01)
  *G06N 3/04* (2006.01)
  *G06N 3/08* (2006.01)

(52) U.S. Cl.
  CPC ............ *G06N 3/0445* (2013.01); *G06N 3/08* (2013.01)

(58) Field of Classification Search
  CPC .................................................. G06N 3/0445
  USPC ........................................................ 706/25
  See application file for complete search history.

(56) References Cited

U.S. PATENT DOCUMENTS

| 7,386,527 B2 * | 6/2008 | Harris | G06K 9/6269 706/12 |
| 2017/0076196 A1 * | 3/2017 | Sainath | G06N 3/084 |
| 2017/0103312 A1 * | 4/2017 | Henry | G06F 15/82 |

FOREIGN PATENT DOCUMENTS

WO  WO-2014119226 A2 *  8/2014  ............ G06N 7/005

OTHER PUBLICATIONS

Arjovsky et al., "Unitary Evolution Recurrent Neural Networks," arXiv:1511.06464v3 [cs.LG], Feb. 2016, pp. 1-11.
Colah, "Understanding LSTM Networks," Colah's Blog, Aug. 27, 2015 [retrieved on Apr. 19, 2016]. Retrieved from the Internet: URL<http://colah.github.io/posts/2015-08-Understanding-LSTMs/>, 11 pages.
Correa et al., "Stabilizing and Improving the Learning Speed of 2-Layered LSTM Network," Computational Science and Engineering, 2008. CSE '08. 11th IEEE International Conference on, Jul. 2008, pp. 293-300.
Gers et al., "Extended LSTM with Forget Gates," NIPS, 1999, 8 pages.
Karpathy et al., "Visualizing and Understanding Recurrent Networks," arXiv:1506.02078v2 [cs.LG], Nov. 2015, pp. 1-12.

\* cited by examiner

Primary Examiner — Ajay Arora
(74) Attorney, Agent, or Firm — Fish & Richardson P.C.

(57) ABSTRACT

Methods, systems, and apparatus, including computer programs encoded on computer storage media, for implementing long-short term memory cells with saturating gating functions. One of the systems includes a first Long Short-Term Memory (LSTM) cell, wherein the first LSTM cell is configured to, for each of the plurality of time steps, generate a new cell state and a new cell output by applying a plurality of gates to a current cell input, a current cell state, and a current cell output, each of the plurality of gates being configured to, for each of the plurality of time steps: receive a gate input vector, generate a respective intermediate gate output vector from the gate input, and apply a respective gating function to each component of the respective intermediate gate output vector, wherein the respective gating function for at least one of the plurality of gates is a saturating gating function.

12 Claims, 4 Drawing Sheets

LONG SHORT-TERM MEMORY CELLS WITH SATURATING GATING FUNCTIONS

BACKGROUND

This specification relates to neural network system architectures.

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

Some neural networks are recurrent neural networks. A recurrent neural network is a neural network that receives an input sequence and generates an output sequence from the input sequence. In particular, a recurrent neural network can use some or all of the internal state of the network from a previous time step in computing an output at a current time step. An example of a recurrent neural network is a Long Short-Term Memory (LSTM) neural network that includes one or more LSTM cells that each include an input gate, a forget gate, and an output gate that allow the cell to store previous states for the cell, e.g., for use in generating a current activation or to be provided to other components of the LSTM neural network.

SUMMARY

This specification describes technologies that relate to recurrent neural network architectures. In general, a recurrent neural network includes a Long Short-Term Memory (LSTM) cell that has at least one gate that has a saturating gating function. Optionally, the LSTM cell may also be configured to apply one or more saturating squashing functions as part of processing neural network inputs.

For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

The subject matter described in this specification can be implemented in particular embodiments so as to realize one or more of the following advantages. The performance of a recurrent neural network can be improved by including a saturating LSTM cell in the recurrent neural network that has a saturating gating function and, optionally, a saturating squashing function. In particular, by including the saturating LSTM cell in the recurrent neural network, the recurrent neural network is configured to be able to fully remember or fully forget values during processing of neural network inputs. A recurrent neural network having a saturating LSTM cell can be effectively trained to achieve the improved performance by modifying the objective function used to train the recurrent neural network.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
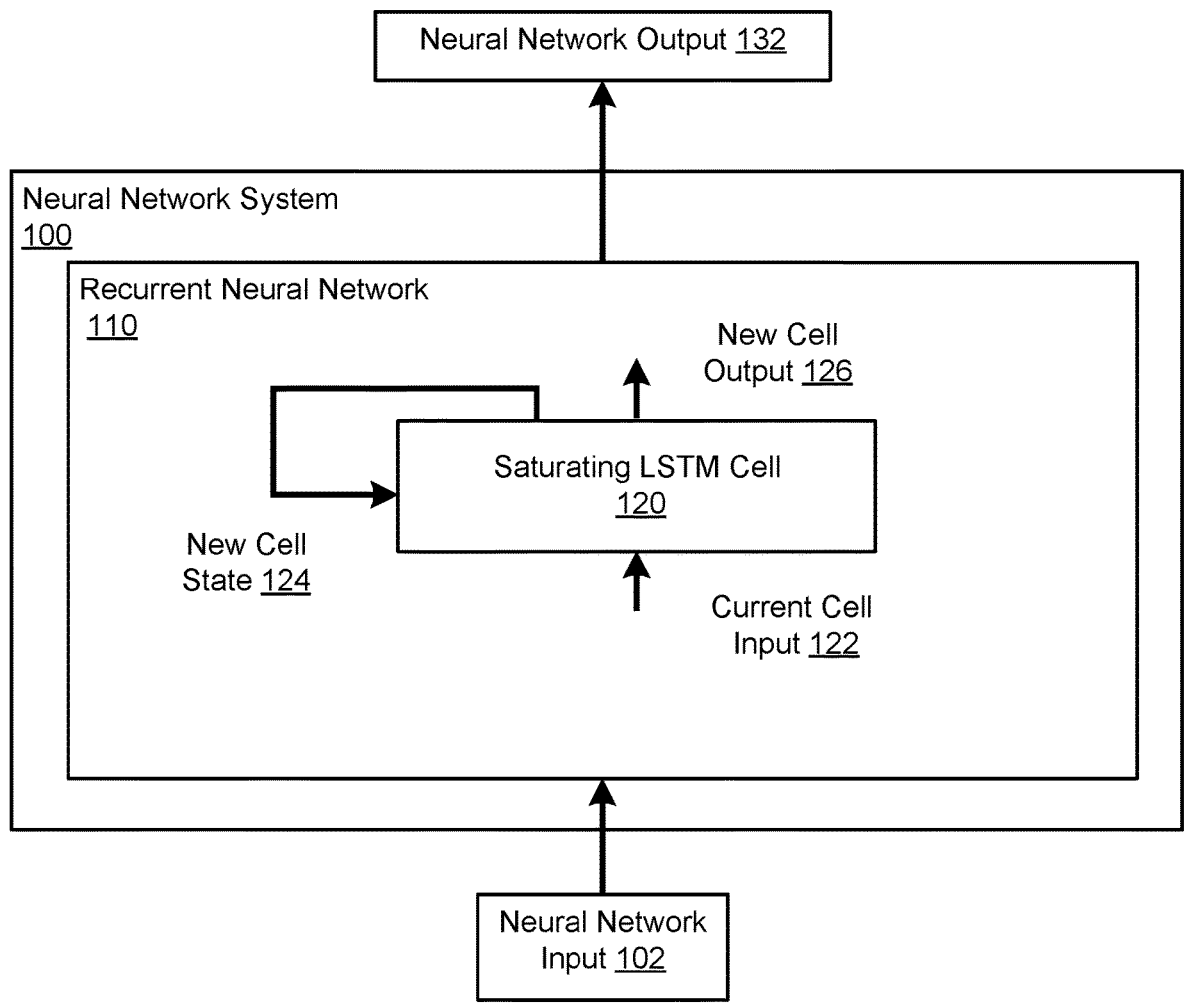
FIG. 1 shows an example neural network system.

FIG. 1 shows an example neural network system 100. The neural network system 100 is an example of a system implemented as computer programs on one or more computers in one or more locations, in which the systems, components, and techniques described below are implemented.

The neural network system 100 is a machine learning system that receives a respective neural network input at each of multiple time steps and generates a respective neural network output at each of the time steps. That is, at each of the multiple time steps, the neural network system 100 receives a neural network input and processes the neural network input to generate a neural network output. For example, at a given time step, the neural network system 100 can receive a neural network input 102 and generate a neural network output 132.

The neural network system 100 can store the generated neural network outputs in an output data repository or provide the neural network outputs for use for some other immediate purpose.

The neural network system 100 can be configured to receive any kind of digital data input and to generate any kind of score or classification output based on the input.

For example, if the inputs to the neural network system 100 are images or features that have been extracted from images, the output generated by the neural network system 100 for a given image may be scores for each of a set of object categories, with each score representing an estimated likelihood that the image contains an image of an object belonging to the category.

As another example, if the inputs to the neural network system 100 are Internet resources (e.g., web pages), documents, or portions of documents or features extracted from Internet resources, documents, or portions of documents, the output generated by the neural network system 100 for a given Internet resource, document, or portion of a document may be a score for each of a set of topics, with each score representing an estimated likelihood that the Internet resource, document, or document portion is about the topic.

As another example, if the inputs to the neural network system 100 are features of a personalized recommendation for a user, e.g., features characterizing the context for the recommendation, e.g., features characterizing previous actions taken by the user, the output generated by the neural network system 100 may be a score for each of a set of content items, with each score representing an estimated likelihood that the user will respond favorably to being recommended the content item. In some of these examples, the neural network system 100 is part of a reinforcement learning system that provides content recommendations to users.

As another example, if the input to the neural network system 100 is text in one language, the output generated by the neural network system 100 may be a score for each of a set of pieces of text in another language, with each score representing an estimated likelihood that the piece of text in the other language is a proper translation of the input text into the other language.

As another example, if the input to the neural network system 100 is features of a spoken utterance, the output generated by the neural network system 100 may be a score for each of a set of pieces of text, each score representing an estimated likelihood that the piece of text is the correct transcription for the utterance.

As another example if the inputs to the neural network system 100 are images, the output generated by the neural network system 100 may be a score for each of a set of pieces of text, each score representing an estimated likelihood that the piece of text is text that is present in the input image.

In particular, the neural network system 100 includes a recurrent neural network 110 which, in turn, includes a saturating Long Short-Term Memory (LSTM) cell 120. The recurrent neural network 110 is configured to, at each of the time steps, receive the neural network input and to process the neural network input to generate the neural network output at the time step.

In addition to the saturating LSTM cell 120, the recurrent neural network 110 may include one or more other components, e.g., other saturating LSTM cells, conventional LSTM cells, other recurrent neural network layers, other non-recurrent neural network layers, and so on.

For example, the recurrent neural network 100 may be a deep LSTM network that includes an input layer, multiple LSTM cells including the saturating LSTM cell 120 arranged in a stack one on top of one another, and an output layer that, at each time step, receives the cell output from the highest LSTM cell in the stack and, optionally, other LSTM cells in the stack, and processes the cell output to generate the neural network output 132 at the time step.

The saturating LSTM cell 120 is configured to, at each of the time steps, receive a current cell input 122 and to process the current cell input 122, a current cell state, and a current cell output to generate a new cell output 126 and to update the current cell state to generate a new cell state 124.

Depending on the configuration of the recurrent neural network 110, the current cell input 122 may be the neural network input 102 or an output generated by a different component of the recurrent neural network 110.

Additionally, for each time step after the first step, the current cell state is the new cell state generated at the preceding time step and the current cell output is the new cell output from the preceding time step. For the first time step, the current cell state may be a predetermined initial cell state and the current cell output may be a predetermined initial cell output.

In particular, the saturating LSTM cell 120 applies multiple gates to the current cell input 122, the current cell state, and the current cell output to generate the new cell output 126 and to update the current cell state to generate the new cell state 124, with at least one of the gates being a gate with a saturating gating function. As will be described in more detail below, a saturating gating function, unlike a conventional gating function, is a gating function that has a range that includes zero, one, or both. Saturating LSTM cells and applying gates to generate a cell output are described in more detail below with reference to FIGS. 2 and 3.

Depending on the configuration of the recurrent neural network 110, the new cell output 126 may be provided as input to another LSTM cell in the recurrent neural network 120, as input to a different type of neural network component, e.g., to an output layer or a different type of neural network layer, or may be provided as the neural network output 132 of the recurrent neural network 110.

In order to configure the recurrent neural network 110 to generate neural network outputs, the neural network system 100 trains the recurrent neural network 110 to determine trained values of the parameters of the recurrent neural network 110, including determining trained values of the parameters of the saturating LSTM cell 120. Training the recurrent neural network is described in more detail below with reference to FIG. 4.

Figure 2:
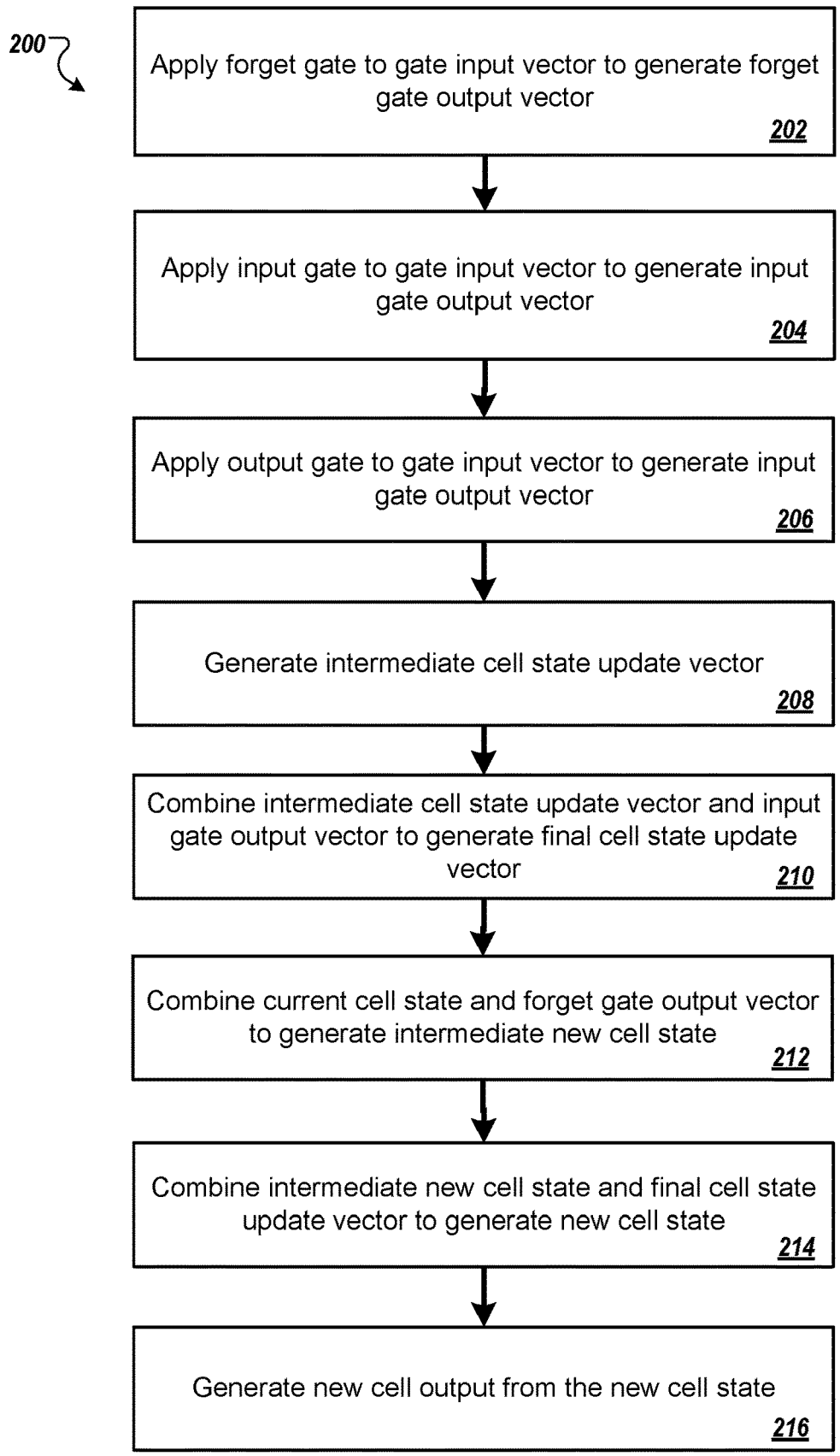
FIG. 2 is a flow diagram of an example process for processing a current cell input to generate a next cell output.

FIG. 2 is a flow diagram of an example process 200 for processing a current cell input to generate a next cell output. For convenience, the process 200 will be described as being performed by a saturating LSTM cell implemented by a system of one or more computers located in one or more locations. For example, a saturating LSTM cell in a neural network system, e.g., the saturating LSTM cell 120 of the neural network system 100 of FIG. 1, appropriately programmed in accordance with this specification, can perform the process 200.

The LSTM cell applies a forget gate to a gate input vector to generate a forget gate output vector (step 202). Applying a gate to a gate input vector will be described in more detail below with reference to FIG. 3.

In some implementations, the LSTM cell generates the gate input vector by concatenating the current cell input and the current cell output. In some other implementations, the LSTM cell is a peephole LSTM cell that generates the gate input vector by concatenating the current cell input, the current cell output, and the current cell state.

The LSTM cell applies an input gate to the gate input vector to generate an input gate output vector (step 204). Applying a gate to a gate input vector will be described in more detail below with reference to FIG. 3.

In some implementations, instead of applying the input gate to generate the input gate output vector, the system uses the forget gate output vector as the input gate output vector. That is, in some implementations, the input gate is the same as the forget gate.

The LSTM cell applies an output gate to the gate input vector to generate an output gate output vector (step 206). Applying a gate to a gate input vector will be described in more detail below with reference to FIG. 3.

The LSTM cell generates an intermediate cell state update vector from the current cell input and the current cell output (step 208). In particular, the LSTM cell processes the current cell input and the current cell output using a neural network layer having an activation function that is a squashing function to generate the intermediate cell state update vector.

Generally, a squashing function is a function that maps received inputs to a range of −1 to 1, exclusive. For example, the squashing function may be the hyperbolic tangent function.

In some implementations, however, the squashing function is a saturating squashing function. A saturating squashing function is a function that maps inputs to a range of −1 to 1, inclusive of at least one of −1 or 1. For example, in some implementations, the saturating squashing function s satisfies:

$$s(u)=\min(1,\max(-1,u)),$$

where u is an input to the saturating squashing function, i.e., the output of another operation performed on the current cell input and the current cell output by the neural network layer. For example, the neural network layer may be a layer that performs a matrix multiplication between a parameter matrix and a concatenation of the current cell input and the current cell output, adds a bias vector to the product, and then applies the saturating squashing function to each component of the resulting vector.

The LSTM cell combines the intermediate cell state update vector and the input gate output vector to generate a final cell state update vector (step 210). In particular, the LSTM cell computes a point-wise multiplication between the intermediate cell state update vector and the input gate output vector to generate the final cell state update vector.

The LSTM cell combines the current cell state and the forget gate output vector to generate an intermediate new cell state (step 212). In particular, the LSTM cell computes a point-wise multiplication between the current cell state and the forget output vector to generate the intermediate new cell state.

The LSTM cell combines, e.g., sums, the intermediate new cell state and the final cell state update vector to generate a final new cell state (step 214).

The LSTM cell generates a new cell output from the final new cell state (step 216).

To generate the new cell output, the LSTM cell applies a squashing function to each component of the final new cell state to generate an intermediate new cell output. In some implementations, the LSTM cell applies a saturating squashing function, i.e., a saturating squashing function having the properties described above, in place of the squashing function to the components of the final new cell state.

The LSTM cell then combines the output gate output vector and the intermediate new cell output to generate the new cell output. In particular, the LSTM cell performs a pointwise multiplication between the output gate output vector and the intermediate new cell output to generate the new cell output.

In addition to using the final new cell state in generating the new cell output, the LSTM cell maintains the final new cell state along with the new cell output for use at a subsequent time step.

Figure 3:
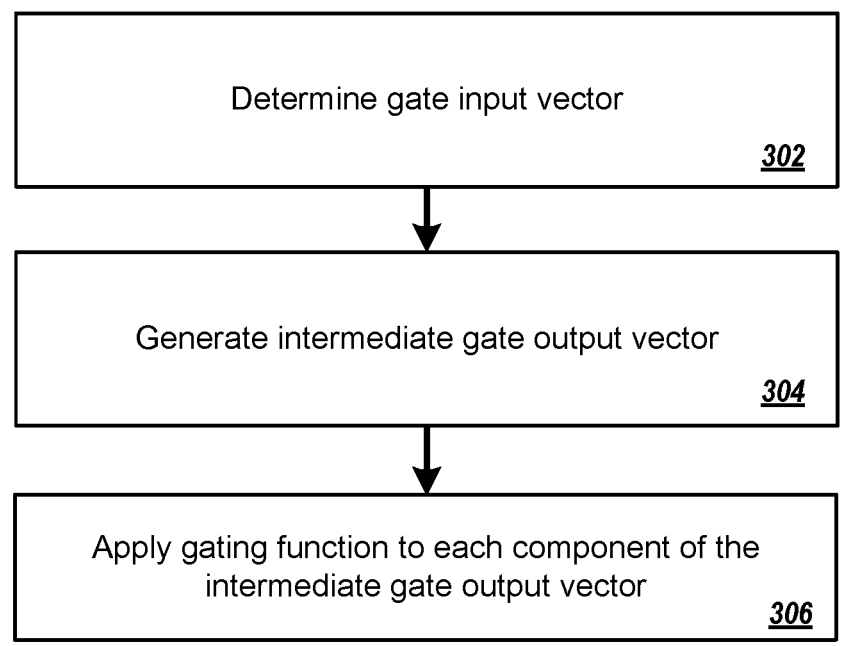
FIG. 3 is a flow diagram of an example process for applying a gate to a gate input vector to generate a gate output vector.

FIG. 3 is a flow diagram of an example process 300 for applying a gate to a gate input vector to generate a gate output vector. For convenience, the process 300 will be described as being performed by a saturating LSTM cell implemented by a system of one or more computers located in one or more locations. For example, a saturating LSTM cell in a neural network system, e.g., the LSTM cell 120 of the neural network system 100 of FIG. 1, appropriately programmed in accordance with this specification, can perform the process 300.

The LSTM cell determines the gate input vector (step 302).

The LSTM cell generates a respective intermediate gate output vector from the gate input vector in accordance with a set of parameters (step 304). In some implementations, the LSTM cell performs a matrix multiplication between a parameter matrix and the gate input vector and then adds a bias vector to the output of the matrix multiplication to generate the intermediate gate output vector, with each of the gates having different parameter matrices and bias vectors. That is, in implementations where the LSTM cell has a distinct input gate, forget gate, and output gate, each of these gates will have different parameter matrices and bias vectors from each other gate.

The LSTM cell applies a gating function to each component of the respective intermediate gate output vector to generate a final gate output vector (step 306).

Generally, a gating function is a function that maps received inputs to a range of 0 to 1, exclusive. For example, a gating function may be the sigmoid function.

For at least one of the gates of the LSTM cell, however, the gating function is a saturating gating function. A saturating gating function is a function that maps inputs to a range of 0 to 1, inclusive of at least one of 0 or 1. For example, in some implementations, the saturating gating function g satisfies:

$$g(u)=\min(0.5,\max(-0.5,u))+0.5,$$

where u is one of the components of an intermediate gate output vector.

As another example, instead of the maximum of −0.5 and u, the saturating gating function may compute the maximum of −0.5 and (c×u), where c is a constant value, e.g., 0.25 or 0.5.

Figure 4:
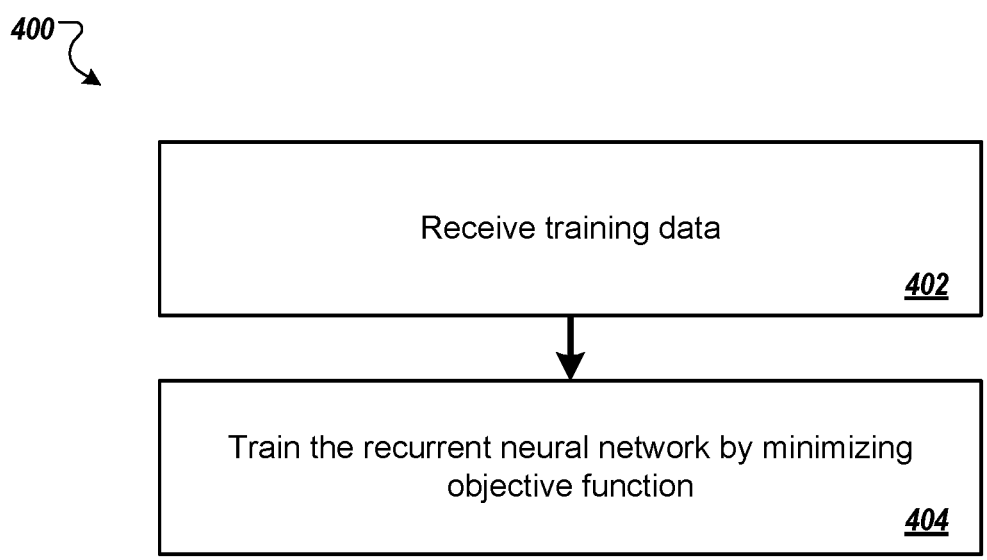
FIG. 4 is a flow diagram of an example process for training a recurrent neural network that includes a saturating LSTM cell.

FIG. 4 is a flow diagram of an example process 400 for training a recurrent neural network that includes a saturating LSTM cell. For convenience, the process 400 will be described as being performed by a system of one or more computers located in one or more locations. For example, a neural network system, e.g., the neural network system 100 of FIG. 1, appropriately programmed in accordance with this specification, can perform the process 400.

The system obtains training data for training the recurrent neural network (step 402). The training data includes multiple training example pairs, with each training example pair including a training neural network input and a target neural network output for the training neural network input.

The system trains the recurrent neural network on the training data to determine trained values of the parameters of the recurrent neural network from initial values of the parameters by optimizing, i.e., either maximizing or minimizing, an objective function (step 404).

In particular, the objective function includes one or more terms that, for each training example pair, penalize the recurrent neural network for the error between the target neural network output for the training neural network input in the training example pair and the output generated by processing the neural network input in the training example pair using the recurrent neural network. Generally, the penalty imposed on the recurrent neural network by these terms will be greater the greater the error between the target neural network output and the generated neural network output. For example, when the objective function is a loss function that is being minimized, these one or more terms can be a squared loss or a cross-entropy loss.

To account for the saturating LSTM cell being included in the recurrent neural network, the objective function also includes, for each gate in the saturating LSTM cell that has a saturating gating function and for each input to which the gating function is applied during processing of a neural network input by the recurrent neural network, a respective saturating gate term that penalizes the recurrent neural network for the input not being zero. More specifically, each saturating gate term imposes a greater penalty on the recurrent neural network the farther the corresponding input is from zero. For example, when the objective function is a loss function that is being minimized, each saturating gate term can be an L2 penalty that is of the form $\lambda u^2$, with u being the input and $\lambda$ being a weight.

In some implementations, the value of $\lambda$ is a user-specified input. In some other implementations, the value of $\lambda$ is optimized on a validation set prior to the training of the recurrent neural network.

By including the saturating gate terms in the objective function, the system prevents the recurrent neural network from generating inputs to saturating gating functions that are too far into the saturated regime, while still allowing the gate to saturate if completely forgetting or completely remembering the input is sufficiently useful during processing of a given neural network input.

In implementations where the saturating LSTM cell applies one or more saturating squashing functions as part of processing a neural network input, the objective function also includes, for each saturating squashing function and for each input to which the saturating activation function is applied during processing of a neural network input by the recurrent neural network, a respective saturating squashing function term that penalizes the recurrent neural network for the input not being zero. More specifically, each saturating squashing function term imposes a greater penalty on the recurrent neural network the farther the corresponding input is from zero. For example, when the objective function is a loss function that is being minimized, each saturating squashing function term can also be an L2 penalty term.

The system trains the recurrent neural network by optimizing the objective function using a conventional machine learning training technique, e.g., a stochastic gradient descent with backpropagation through time training technique. That is, the system can perform multiple iterations of the training technique to optimize the objective function by adjusting the values of the parameters of the recurrent neural network.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a relationship graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:
1. A system comprising:
a recurrent neural network implemented by one or more computers, wherein the recurrent neural network is configured to receive a respective neural network input at each of a plurality of time steps and to generate a respective neural network output at each of the plurality of time steps, and wherein the recurrent neural network comprises:
a first Long Short-Term Memory (LSTM) cell, wherein the first LSTM cell is configured to, for each of the plurality of time steps, generate a new cell state and a new cell output by applying a plurality of gates to a current cell input, a current cell state, and a current cell output, each of the plurality of gates being configured to, for each of the plurality of time steps:
receive a gate input vector,
generate a respective intermediate gate output vector from the gate input vector in accordance with a respective set of parameters, and
apply a respective gating function to each component of the respective intermediate gate output vector to generate a respective final gate output vector,
wherein the respective gating function for at least one of the plurality of gates is a saturating gating function, and wherein a saturating gating function is a function that has a range that includes at least one of zero or one.
2. The system of claim 1, wherein at least one of the saturating gating functions g satisfies:

$$g(u)=\min(0.5,\max(-0.5,u))+0.5,$$

wherein u is one of the components of an intermediate gate output vector.
3. The system of claim 1, wherein the plurality of gates includes an input gate, and wherein generating the new cell state comprises:
processing the current cell input and the current cell output using a neural network layer having an activation function that is a saturating squashing function to generate an intermediate cell state update vector;
combining the respective final gate output vector of the input gate and the intermediate cell state update vector to generate a final cell state update vector; and
updating the cell state using the final cell state update vector.
4. The system of claim 3, wherein the plurality of gates includes a forget gate, and wherein updating the cell state using the final cell state update vector comprises:
combining the respective final gate output vector of the forget gate and the current cell state to generate an intermediate new cell state; and
combining the intermediate new cell state and the final cell state update vector to generate the new cell state.
5. The system of claim 3, wherein a saturating squashing function is a function that maps inputs to a range of −1 to 1, including at least one of −1 or 1.
6. The system of claim 5, wherein the saturating squashing function s satisfies:

$$s(u)=\min(1,\max(-1,u)),$$

wherein u is an input to the saturating squashing function.
7. The system of claim 1, wherein the plurality of gates includes an output gate, and wherein generating the new cell output comprises:

applying a saturating squashing function to each component of the new cell state to generate an intermediate new cell output; and
combining the respective final gate output vector of the output gate and the intermediate new cell output to generate the new cell output.

8. The system of claim 7, wherein a saturating squashing function is a function that has a range that includes at least one of −1 or 1.

9. The system of claim 8, wherein the saturating squashing function s satisfies:

$$s(u)=\min(1,\max(-1,u)),$$

wherein u is an input to the saturating squashing function.

10. The system of claim 1, wherein the first LSTM cell is configured to concatenate the current cell input and the current cell output to generate the gate input vector.

11. The system of claim 1, wherein the first LSTM cell is configured to concatenate the current cell input, the current cell state, and the current cell output to generate the gate input vector.

12. One or more non-transitory computer storage media encoded with a computer program product, the computer program product comprising instructions that when executed by one or more computers cause the one or more computers to perform operations to implement:

a recurrent neural network, wherein the recurrent neural network is configured to receive a respective neural network input at each of a plurality of time steps and to generate a respective neural network output at each of the plurality of time steps, and wherein the recurrent neural network comprises:
a first Long Short-Term Memory (LSTM) cell, wherein the first LSTM cell is configured to, for each of the plurality of time steps, generate a new cell state and a new cell output by applying a plurality of gates to a current cell input, a current cell state, and a current cell output, each of the plurality of gates being configured to, for each of the plurality of time steps:
receive a gate input vector,
generate a respective intermediate gate output vector from the gate input vector in accordance with a respective set of parameters, and
apply a respective gating function to each component of the respective intermediate gate output vector to generate a respective final gate output vector,
wherein the respective gating function for at least one of the plurality of gates is a saturating gating function, and wherein a saturating gating function is a function that has a range that includes at least one of zero or one.

* * * * *

UNITED STATES PATENT AND TRADEMARK OFFICE
CERTIFICATE OF CORRECTION

PATENT NO. : 10,521,715 B1
APPLICATION NO. : 14/997422
DATED : December 31, 2019
INVENTOR(S) : Joffe et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 877 days.

Signed and Sealed this
Twenty-fourth Day of November, 2020

Andrei Iancu
*Director of the United States Patent and Trademark Office*